(12) United States Patent
Zhang et al.

(10) Patent No.: US 10,012,790 B2
(45) Date of Patent: Jul. 3, 2018

(54) SLIM BEZEL BACKLIGHT MODULE AND LIQUID CRYSTAL DISPLAY APPARATUS HAVING THE SAME

(71) Applicant: WUHAN CHINA STAR OPTOELECTRONICS TECHNOLOGY CO., LTD., Wuhan, Hubei (CN)

(72) Inventors: Wei Zhang, Hubei (CN); Shih hsiang Chen, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 140 days.

(21) Appl. No.: 15/301,962

(22) PCT Filed: Jul. 12, 2016

(86) PCT No.: PCT/CN2016/089721
§ 371 (c)(1),
(2) Date: Oct. 5, 2016

(87) PCT Pub. No.: WO2017/219401
PCT Pub. Date: Dec. 28, 2017

(65) Prior Publication Data
US 2018/0059316 A1    Mar. 1, 2018

(30) Foreign Application Priority Data

Jun. 22, 2016 (CN) .......................... 2016 1 0459513

(51) Int. Cl.
*G02F 1/1333* (2006.01)
*F21V 8/00* (2006.01)

(52) U.S. Cl.
CPC ......... *G02B 6/0088* (2013.01); *G02B 6/0055* (2013.01); *G02F 1/133308* (2013.01); *G02B 6/0065* (2013.01); *G02F 2001/133322* (2013.01)

(58) Field of Classification Search
CPC ........ G02F 2001/133308; G02F 2001/133314; G02F 2001/133317; G02F 2001/13332
See application file for complete search history.

(56) References Cited

U.S. PATENT DOCUMENTS

2012/0127393 A1* 5/2012 Hamada .................... G09F 7/18
349/58

* cited by examiner

Primary Examiner — Phu Vu
(74) Attorney, Agent, or Firm — Mark M. Friedman

(57) ABSTRACT

A slim bezel backlight module and a liquid crystal display apparatus having the same are disclosed. The backlight module includes a light source, a light guide plate, a reflector, a plastic frame assembly and a square-shaped adhesive tape. The plastic frame assembly is designed to be integrated by iron material and plastic material, and a few plastic portions of the plastic frame assembly protruded from the sides of the plastic frame assembly to form a zigzagged surface for increasing the adhesion area for the square-shaped adhesive tape, thereby solving the problem that the lack of enough border width makes the plastic frame assembly hard to be processed and assembled.

20 Claims, 3 Drawing Sheets

SLIM BEZEL BACKLIGHT MODULE AND LIQUID CRYSTAL DISPLAY APPARATUS HAVING THE SAME

BACKGROUND OF THE INVENTION

Field of the Invention

The present invention relates to the technical field of liquid crystal display, and more particularly to a slim bezel backlight module and a liquid crystal display apparatus having the slim bezel backlight module.

Description of the Related Art

With the development of mobile communication products and tablet computers, a lot of mobile phone manufacturers use "slim bezel" as a selling point to attract consumers. The width of a plastic frame of a backlight module is in direct relation to the border width of a mobile phone.

In a traditional backlight module, a black-white double-faced or black-black double-faced square-shaped adhesive tape will be adhered to the plastic frame so as to achieve connecting the liquid crystal module and the backlight module and preventing separation of optical films. In the meantime, the square-shaped adhesive tape is further used to block the gaps between the light guide plate and the optical films in the backlight module so as to prevent light leakage.

To avoid separation of optical films, the inner side of the ring structure of the square-shaped adhesive tape has to extend to the optical films, and the extension width on the optical film must meet a certain requirement. In the meantime, the square-shaped adhesive tape requires a certain stability to be fully adhered to the plastic frame. Therefore, the frame requires a certain border width to ensure the adhesion strength.

The border of current liquid crystal display modules has become slimmer, thereby resulting in a production limit of 0.45 mm for the border at two sides of the plastic frame. Thus, the processing and assembling of the square-shaped adhesive tape for the aspect of slim bezel is quite difficult.

Therefore, a technical problem existing in the conventional technology is that when the border width of a conventional plastic frame structure is too small for a square-shaped adhesive tape to have sufficient adhesion area to be adhered thereon, a firmly-connection between the square-shaped adhesive tape and the backlight module cannot be achieved.

SUMMARY OF THE INVENTION

An objective of the present invention is to provide an array substrate and a liquid crystal display apparatus having the same so as to solve the technical problem where a conventional array substrate has small storage capacitance and thereby affecting its display performance.

In order to solve the foregoing problem, the technical solutions of the present invention are as follows:

The present invention provides a slim bezel backlight module which is able to achieve a slim bezel for the plastic frame and at the same ensure the adhesion width for the square-shaped adhesive tape so as to satisfy the adhesion strength between the backlight module and the liquid crystal panel.

In order to solve the foregoing problems, the present invention provides a slim bezel backlight module including:

a light source providing backlighting for a liquid crystal panel;

a reflector used to reflect light to a desired surface;

a light guide plate used to convert light emitted from the light source into a directional surface light source;

a plastic frame assembly, including an iron frame disposed on a bottom and a plastic member disposed on the iron frame, and being used to fix the light guide plate; wherein the iron frame has two ends where one end extends to one side close to a light source, and the other end extends to another side opposite to the light source, and the ends of the iron frame are provided with a plurality of bending structures;

a square-shaped adhesive tape being adhered to a surface of the plastic frame assembly; and a plurality of bumps formed inside the bending structures of the plastic frame assembly by plastic injection; wherein top surfaces of the bumps are co-planar with a top surface of the plastic frame assembly; each of the bumps has a protruding width of 0.1 mm to 0.15 mm; wherein the bumps are divided into a first bump group and a second bump group; the first bump group and the second bump group are mounted on two sides of the plastic frame assembly, respectively.

According to a preferred embodiment of the present invention, the bumps in the first bump group and the second bump group are disposed at intervals along a transverse direction.

According to a preferred embodiment of the present invention, the bumps in the first bump group and the bumps in the second bump group are symmetrically arranged relative to a center defined by a longitudinal axial line of the plastic frame assembly.

According to a preferred embodiment of the present invention, the bumps in the first bump group and the bumps in the second bump group are symmetrically arranged relative to a center defined by a transverse axial line of the plastic frame assembly.

According to a preferred embodiment of the present invention, the adjacent bumps are distributed at equal intervals.

According to a preferred embodiment of the present invention, the adjacent bumps are distributed at unequal intervals.

According to a preferred embodiment of the present invention, an interval between the adjacent bumps disposed close to the ends of the plastic frame assembly is smaller than the interval between the adjacent bumps disposed close to the middle of the plastic frame assembly.

According to a preferred embodiment of the present invention, the plastic frame assembly has a side portion with a width of 0.2 mm to 0.3 mm.

According to a preferred embodiment of the present invention, a frame portion of the square-shaped adhesive tape is adhered to a top of the plastic frame assembly; and an outer edge of the frame portion of the square-shaped adhesive tape extends to an edge of the bumps, and an inner edge of the frame portion of the square-shaped adhesive tape extends 0.1 mm to 0.2 mm beyond an inner side of the plastic frame assembly.

According to a preferred embodiment of the present invention, the square-shaped adhesive tape has a frame portion with a width of 0.45 mm to 0.55 mm.

The present invention further provides a slim bezel backlight module including:

a light source providing backlighting for a liquid crystal panel;

a reflector used to reflect light to a desired surface;

a light guide plate used to convert light emitted from the light source into a directional surface light source;

a plastic frame assembly, including an iron frame disposed on a bottom and a plastic member disposed on the iron frame, and being used to fix the light guide plate; wherein the iron frame has two ends where one end extends to one side close to a light source, and the other end extends to another side opposite to the light source, and the ends of the iron frame are provided with a plurality of bending structures;

a square-shaped adhesive tape being adhered to a surface of the plastic frame assembly; and a plurality of bumps formed inside the bending structures of the plastic frame assembly by plastic injection; wherein top surfaces of the bumps are co-planar with a top surface of the plastic frame assembly.

According to a preferred embodiment of the present invention, the bumps divided into a first bump group and a second bump group; the first bump group and the second bump group are mounted on two sides of the plastic frame assembly, respectively.

According to a preferred embodiment of the present invention, the bumps in the first bump group and the second bump group are disposed at intervals along a transverse direction.

According to a preferred embodiment of the present invention, the bumps in the first bump group and the bumps in the second bump group are symmetrically arranged relative to a center defined by a longitudinal axial line of the plastic frame assembly.

According to a preferred embodiment of the present invention, the bumps in the first bump group and the bumps in the second bump group are alternately arranged.

According to a preferred embodiment of the present invention, the adjacent bumps are distributed at equal intervals.

According to a preferred embodiment of the present invention, the adjacent bumps are distributed at unequal intervals.

According to a preferred embodiment of the present invention, an interval between the adjacent bumps disposed close to the ends of the plastic frame assembly is smaller than the interval between the adjacent bumps disposed close to the middle of the plastic frame assembly.

According to a preferred embodiment of the present invention, the plastic frame assembly has a side portion with a width of 0.2 mm to 0.3 mm.

According to a preferred embodiment of the present invention, a frame portion of the square-shaped adhesive tape is adhered to a top of the plastic frame assembly; and an outer edge of the frame portion of the square-shaped adhesive tape extends to an edge of the bumps, and an inner edge of the frame portion of the square-shaped adhesive tape extends 0.1 mm to 0.2 mm beyond an inner side of the plastic frame assembly.

According to a preferred embodiment of the present invention, the square-shaped adhesive tape has a frame portion with a width of 0.45 mm to 0.55 mm.

Based on the foregoing object of the present invention, a liquid crystal display apparatus is provided and includes: a slim bezel backlight module and a liquid crystal panel fixed on the slim bezel backlight module; wherein the slim bezel backlight module includes:

a light source providing backlighting for a liquid crystal panel;

a reflector used to reflect light to a desired surface;

a light guide plate used to convert light emitted from the light source into a directional surface light source;

a plastic frame assembly, including an iron frame disposed on a bottom and a plastic member disposed on the iron frame, and being used to fix the light guide plate; wherein the iron frame has two ends where one end extends to one side close to a light source, and the other end extends to another side opposite to the light source, and the ends of the iron frame are provided with a plurality of bending structures;

a square-shaped adhesive tape being adhered to a surface of the plastic frame assembly; and a plurality of bumps formed inside the bending structures of the plastic frame assembly by plastic injection; wherein top surfaces of the bumps are co-planar with a top surface of the plastic frame assembly.

According to a preferred embodiment of the present invention, the bumps are divided into a first bump group and a second bump group; the first bump group and the second bump group are mounted on two sides of the plastic frame assembly, respectively.

According to a preferred embodiment of the present invention, the bumps in the first bump group and the second bump group are disposed at intervals along a transverse direction.

According to a preferred embodiment of the present invention, the bumps in the first bump group and the bumps in the second bump group are symmetrically arranged relative to a center defined by a longitudinal axial line of the plastic frame assembly.

According to a preferred embodiment of the present invention, the bumps in the first bump group and the bumps in the second bump group are alternately arranged.

According to a preferred embodiment of the present invention, the adjacent bumps are distributed at equal intervals.

According to a preferred embodiment of the present invention, the adjacent bumps are distributed at unequal intervals.

According to a preferred embodiment of the present invention, an interval between the adjacent bumps disposed close to the ends of the plastic frame assembly is smaller than the interval between the adjacent bumps disposed close to the middle of the plastic frame assembly.

According to a preferred embodiment of the present invention, the plastic frame assembly has a side portion with a width of 0.2 mm to 0.3 mm.

According to a preferred embodiment of the present invention, a frame portion of the square-shaped adhesive tape is adhered to a top of the plastic frame assembly; and an outer edge of the frame portion of the square-shaped adhesive tape extends to an edge of the bumps, and an inner edge of the frame portion of the square-shaped adhesive tape extends 0.1 mm to 0.2 mm beyond an inner side of the plastic frame assembly.

According to a preferred embodiment of the present invention, the square-shaped adhesive tape has a frame portion with a width of 0.45 mm to 0.55 mm.

The slim bezel backlight module and the liquid crystal display apparatus having the same provided by the present invention have the advantages that the plastic frame assembly is designed to be integrated by iron material and plastic material, and a few plastic portions of the plastic frame assembly protruded from the sides of the plastic frame assembly to form a zigzagged surface for increasing the adhesion area for the square-shaped adhesive tape, thereby solving the problem that the lack of enough border width makes the plastic frame assembly hard to be assembled, and achieving that the liquid crystal display apparatus can have a wider display screen compared with other liquid crystal display apparatuses of the same size.

BRIEF DESCRIPTION OF THE DRAWINGS

In order to illustrate the technical proposal of implementations of the embodiments of the present invention or existing technology clearly, With reference to said accompanying drawings, the description of the implementations of the present invention or existing technology are given as following briefly. Obviously, the given accompanying drawings are only implementations of the present invention, so that, the ordinary technicians in this field could get other accompanying drawings in accordance with said accompanying drawings without devoting a creative work.

DETAILED DESCRIPTION OF THE PREFERRED EMBODIMENTS

Figure 1:
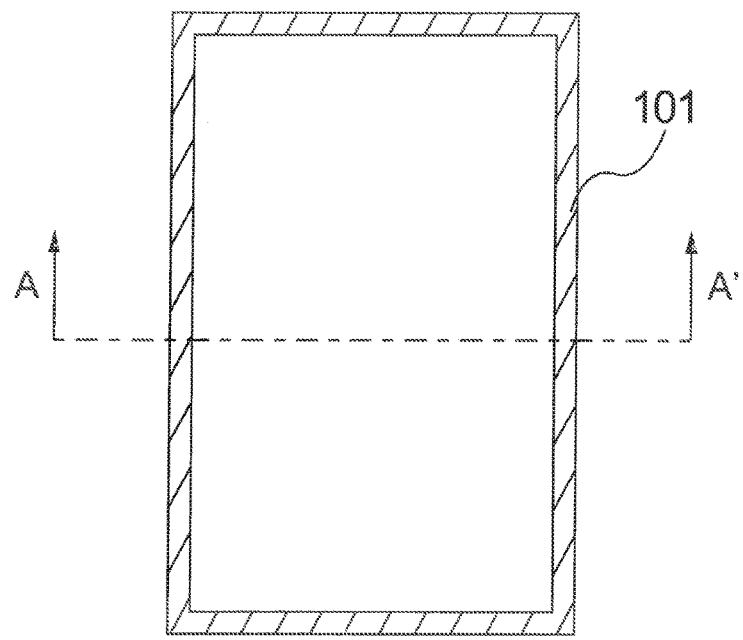
FIG. 1 is a schematic top view of a backlight module according to an embodiment of the present invention.

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto. In the drawings, similar structural units are designated by the same reference numerals.

To solve the technical problem in the assembly process of a conventional backlight module that the plastic bezel is too slim for a square-shaped adhesive tape to be fully adhered thereto, which causes the square-shaped adhesive tape to be unable to firmly connect the backlight module and a liquid crystal panel, the present provides a new backlight module which is able to effectively overcome the shortcoming.

Figure 2:
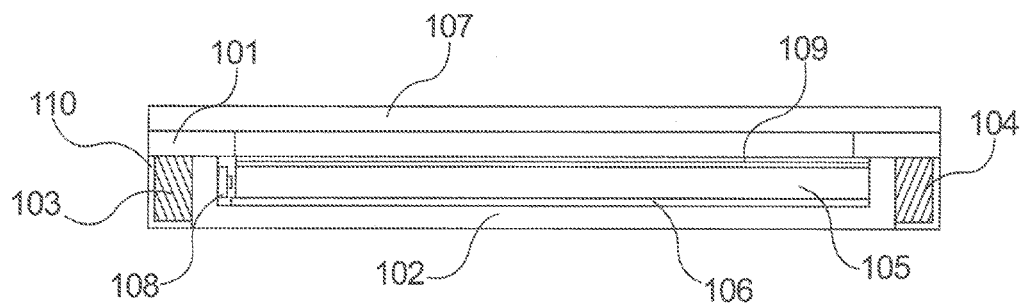
FIG. 2 is a cross-sectional view of the backlight module in FIG. 1 taken along the line A-A'.
Figure 3:
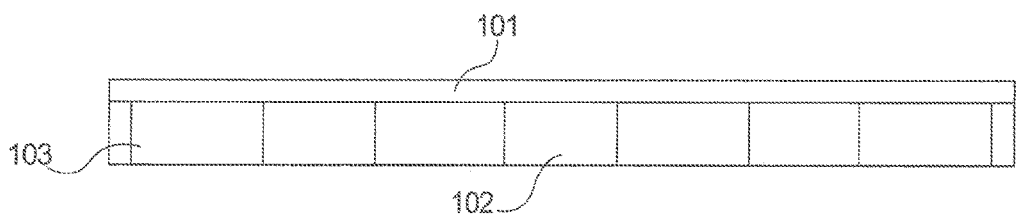
FIG. 3 is a schematic left side view of the backlight module in FIG. 1.

Please refer to FIG. 1 to FIG. 3, a slim bezel backlight module includes a light source 108 which provides backlighting for a liquid crystal panel 107, an optical film 109, a light guide plate 105 used to convert light emitted from the light source 108 into a directional surface light source, a reflector 106 used to reflect light to a desired surface, a plastic frame assembly used to fix the light guide plate 105, a square-shaped adhesive tape 101 adhered to a surface of the plastic frame assembly, and a plurality of bumps. The square-shaped adhesive tape 101 is used to adhesively connect the slim bezel backlight module and the liquid crystal module. Furthermore, a bottom surface and a top surface of the square-shaped adhesive tape 101 are all adhesive surfaces, wherein the bottom surface of the square-shaped adhesive tape 101 is adhered to a top surface of the plastic frame assembly; the top surface of the square-shaped adhesive tape 101 is adhered to a bottom surface of the liquid crystal module. The bumps are divided into a first bump group 103 and a second bump group 104. The first bump group 103 and the second bump group 104 are mounted on and protruded from two sides of the plastic frame assembly, respectively. The top surfaces of the first bump group 103 and the second bump group 104 are co-planar with the top surface of the plastic frame assembly. The bumps in the first bump group 103 and the second bump group 104 are disposed at intervals in a transverse direction.

The plastic frame assembly is integrated by iron material and plastic material, and includes an iron frame 102. The iron frame 102 has two ends where one end extends to one side close to the light source 108, and the other end extends to another side opposite to the light source 108. A plurality of bending structures 110 are mounted on the ends of the iron frame 102. The bending structures 110 are protruded from sides of the iron frame 102 to form a plurality of cavities where each of the cavities is correspondingly occupied by one of the bumps which are formed by plastic injection. The top surfaces of the bumps are co-planar with the top surface of the plastic frame assembly so as to act as extension surfaces of the top surface of the plastic frame assembly.

The plastic frame assembly has a border width of 0.2 mm to 0.3 mm. The square-shaped adhesive tape 101 has a frame portion extending 0.1 mm to 0.2 mm beyond an edge of the bending structure 110. The frame portion of the square-shaped adhesive tape 101 has a width of 0.45 mm to 0.55 mm. The following will describe the preferred embodiment by taking the square-shaped adhesive tape 101 having a frame portion with a width of 0.55 mm, the plastic frame assembly having a border width of 0.3 mm, and the frame portion of the square-shaped adhesive tape 101 extending 0.1 mm beyond the edge of the bending structure 11 as examples.

Currently, the maximum width of the frame portion of the square-shaped adhesive tape 101 that can be manufactured is 0.55 mm. However, the border width of the plastic frame assembly for a legitimate 0.66 mm slim bezel backboard is only 0.3 mm, which is smaller than 0.55 mm, therefore it is difficult to be fully adhered to the square-shaped adhesive tape 101 with the frame portion of 0.55 mm width. The present invention is to mounts a plurality of bumps on the sides of the plastic frame assembly so as to form a zigzagged extension surface of the plastic frame assembly for the square-shaped adhesive tape 101 to be adhered thereon. For example, when the plastic frame assembly has a border width of 0.3 mm, each of the bumps can be mounted with a protruding width of 0.15 mm, so that the sum of the border width of the plastic frame assembly and the protruding width of the bumps will be 0.55 mm. Therefore, when the frame portion of the square-shaped adhesive tape extends to the outer edge of the bumps, the frame portion will have a surplus width of 0.1 mm which extends beyond the side of the bending structure 110 to prevent the frame portion of the square-shaped adhesive tape from being not fully adhered due to assembling tolerance. Accordingly, the maximum width of the frame portion of the square-shaped adhesive tape 101 that can be manufactured will have a better adhesive effect with the plastic frame assembly.

The bumps of the present invention may be arranged in the following arrangement manners:

The present invention provides a backlight module including a light source 108 which provides backlighting for a liquid crystal panel 107, a light guide plate 105 used to convert light emitted from the light source 108 into a directional surface light source, a reflector 106 used to reflect light to a desired surface, a plastic frame assembly used to fix the light guide plate 105, a square-shaped adhesive tape adhered to a surface of the plastic frame assembly, and a plurality of bumps. The bumps are divided into a first bump group 103 and a second bump group 104. The first bump group 103 and the second bump group 104 are mounted on and protruded from two sides of the plastic frame assembly 202, respectively. The top surfaces of the first bump group 103 and the second bump group 104 are co-planar with the top surface of the plastic frame assembly.

The bumps in the first bump group 103 and the second bump group 104 are disposed at intervals in a transverse direction.

The plastic frame assembly is integrated by iron material and plastic material, and includes an iron frame 102. The iron frame 102 has two ends where one end extends to one side close to the light source 108, and the other end extends to another side opposite to the light source 108. A plurality of bending structures 110 are mounted on the ends of the iron frame 102. The bending structures 110 are protruded from sides of the iron frame 102 to form a plurality of cavities where each of the cavities is correspondingly occupied by one of the bumps which are formed by plastic injection. The top surfaces of the bumps are co-planar with the top surface of the iron frame 102 so as to act as extension surfaces of the top surface of the iron frame 102.

Figure 4:
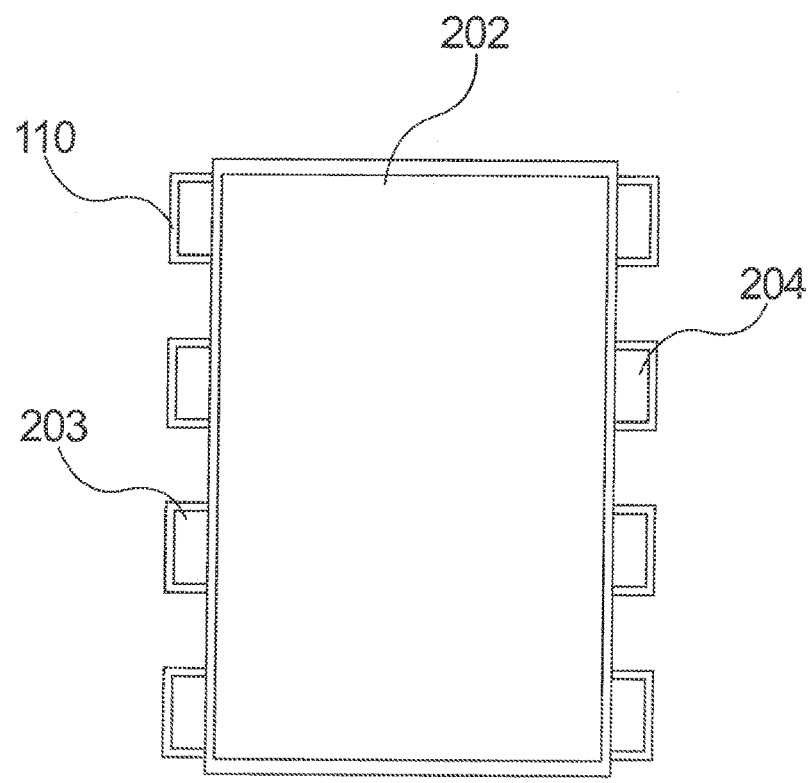
FIG. 4 is a schematic view of a simplified structure of a backlight module according to a first preferred embodiment of the present invention.

For example, as shown in FIG. 4, the bumps in the first bump group 203 and the second bump group 204 disposed on two sides of the iron frame 202 are symmetrically arranged relative to a center defined by a longitudinal axial line of the iron frame 202. Moreover, the adjacent bumps in the first bump group 203 and in the second bump group 204 have the same interval therebetween. For example, the first bump group 203 and the second bump group 204 contain the same number of bumps; and a connection line between two opposite bumps at the left side and the right side of the iron frame 202 is parallel to another connection line between another two opposite bumps.

While applying such technical solution shown in FIG. 4, symmetrically arranging the bumps at two sides of the iron frame 202 may facilitate the mounting of those bumps, and thereby causing the frame portions of the square-shaped adhesive tape to have the same adhesive strength while being adhered to the iron frame 202.

Figure 5:
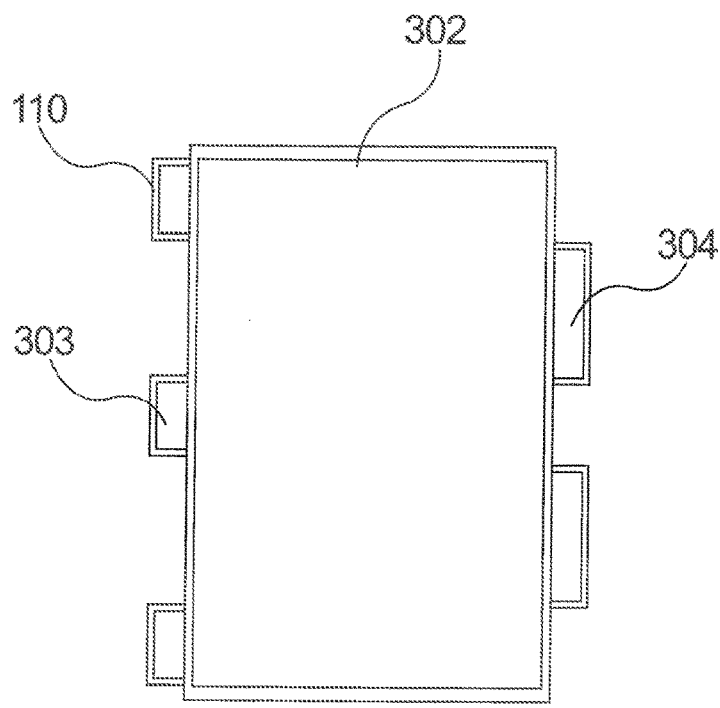
FIG. 5 is a schematic view of a simplified structure of a backlight module according to a second preferred embodiment of the present invention.

For another example, as shown in FIG. 5, the adjacent bumps in the first bump group 303 and in the second bump group 304 disposed on two sides of the iron frame 302 have the same interval therebetween, and the bumps in the first bump group 303 and the bumps in the second bump group 304 are alternately arranged. For example, the first bump group 303 includes three bumps, and the second bump group 304 includes two bumps; each of the bumps of the second bump group 304 is disposed on the iron frame 302 in an opposite position corresponding to a gap between the adjacent bump of the first bump group 303. That is, the every portion on the sides of the iron frame 302 are provided with adhesive surface so as to achieve dense adhesion points between the square-shaped adhesive tape and the iron frame 302, thereby resulting in a overall uniform distribution of adhesive strength for the square-shaped adhesive tape adhered to the surfaces of the iron frame 302.

While applying such technical solution shown in FIG. 5, the bumps on the sides of the iron frame 302 are alternately arranged so that the adhesive strength of the square-shaped adhesive tape adhered to the surfaces of the iron frame 302 can be distributed uniformly, thereby causing the square-shaped adhesive tape to be firmly adhered.

Figure 6:
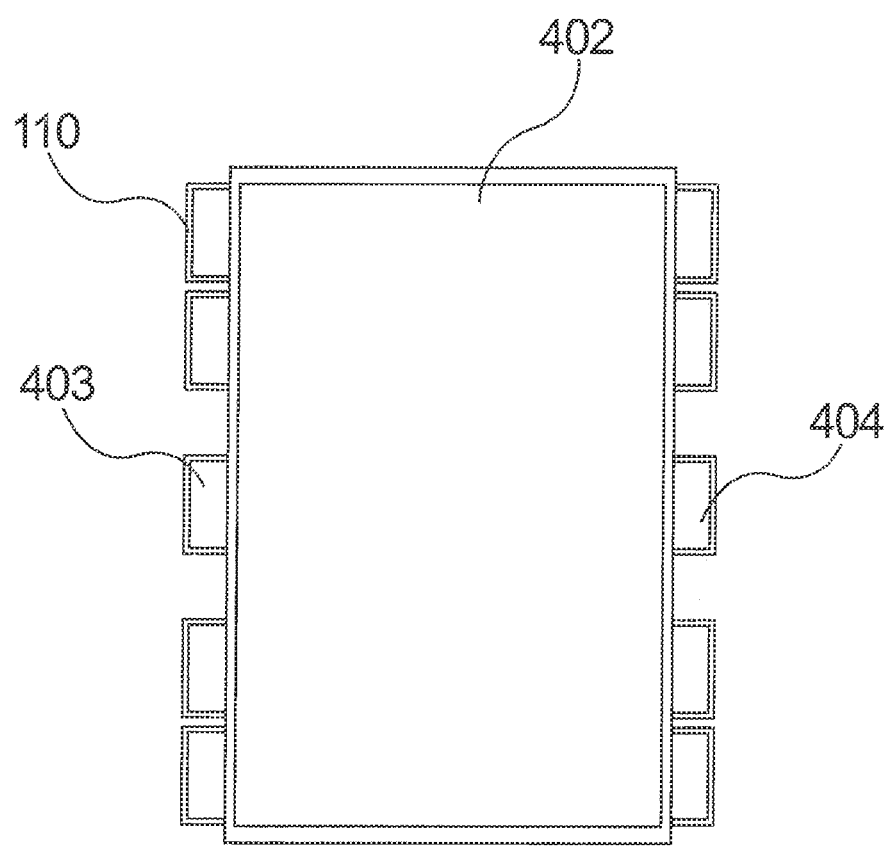
FIG. 6 is a schematic view of a simplified structure of a backlight module according to a third preferred embodiment of the present invention.

For another example, as shown in FIG. 6, the bumps in the first bump group 403 and the second bump group 404 disposed on two sides of the iron frame 402 are symmetrically arranged, and the adjacent bumps in the first bump group 403 and the second bump group 404 are distributed at unequal intervals.

In one embodiment, the first bump group 403 may include five bumps where four of them are divided into two subgroups, each of which includes two bumps, and then respectively disposed at two ends of one side portion of the iron frame 402, wherein an interval between the two bumps in each subgroup is smaller than the interval between the adjacent bumps when the bumps are arranged at equal intervals; and the remainder bump is mounted at a middle of the iron frame, and therefore the major part of overall adhesion is transferred to the ends of the side portion of the iron frame 402, which is able to save materials and still maintain a certain adhesion strength. The second bump group 404 and the first bump group 403 are also symmetrically arranged relative to a center defined by a longitudinal axial line of the iron frame 402, which will not be redundantly described herein again.

In another embodiment, the first bump group 403 may include five bumps, wherein one of the bumps is mounted at a middle of the side portion of the iron frame 402, and the other four are respectively and symmetrically mounted at two sides of this bump and distributed at the ends of the side portion of the iron frame 402; furthermore, from the bump at the middle to the bumps at the ends, the interval between adjacent bumps becomes smaller and smaller, and therefore the major part of overall adhesion is transferred to the positions close to the ends of the side portion of the iron frame 402 so that the adhesion strength between the square-shaped adhesive tape and the iron frame 402 is enhanced. The second bump group 404 and the first bump group 403 are also symmetrically arranged, which will not be redundantly described herein again.

It is found during the assembly process that the square-shaped adhesive tape may easily have a curved edge occurred at the portion adhered to the position of the ends of the iron frame 402, and the curved edge will expand and then extend to the inner of the square-shaped adhesive tape, thereby affecting product use. Thus, by making the adhesion strength applied on the ends of the iron frame 402 to be larger than the adhesion strength applied on the middle of the iron frame 402, the foregoing problem can be solved.

The present invention further provides a liquid crystal display apparatus. The liquid crystal display apparatus includes a backlight module positioned on a bottom position and a liquid crystal module positioned on a top position. The backlight module positioned on the bottom provides backlighting for the liquid crystal module positioned on the top. The liquid crystal module includes a bottom polarized plate, a liquid crystal layer and a top polarized plate which are stacked in order. The slim bezel backlight module includes: a plastic frame assembly having an iron frame disposed on a bottom and a plastic member disposed on the iron frame, and being used to fix the light guide plate, wherein the iron frame has two ends where one end extends to one side close to a light source, and the other end extends to another side opposite to the light source, and the ends of the iron frame are provided with a plurality of bending structures; a square-shaped adhesive tape being adhered to a surface of the plastic frame assembly; and a plurality of bumps formed inside the bending structures of the plastic frame assembly by plastic injection; wherein the top surfaces of the bumps are co-planar with the top surface of the plastic frame assembly.

Preferably, the bumps divided into a first bump group and a second bump group; the first bump group and the second bump group are mounted on two sides of the plastic frame assembly, respectively.

Preferably, the bumps in the first bump group and the second bump group are disposed at intervals along a transverse direction.

Preferably, the bumps in the first bump group and the bumps in the second bump group are symmetrically arranged relative to a center defined by a longitudinal axial line of the plastic frame assembly.

Preferably, the bumps in the first bump group and the bumps in the second bump group are alternately arranged.

Preferably, the adjacent bumps are distributed at equal intervals.

Preferably, the adjacent bumps are distributed at unequal intervals.

Preferably, an interval between the adjacent bumps disposed close to the ends of the plastic frame assembly is smaller than the interval between the adjacent bumps disposed close to the middle of the plastic frame assembly.

Preferably, the plastic frame assembly has a side portion with a width of 0.2 mm to 0.3 mm.

Preferably, a frame portion of the square-shaped adhesive tape is adhered to a top of the plastic frame assembly; and an outer edge of the frame portion of the square-shaped adhesive tape extends to an edge of the bumps, and an inner edge of the frame portion of the square-shaped adhesive tape extends 0.1 mm to 0.2 mm beyond an inner side of the plastic frame assembly.

Preferably, the square-shaped adhesive tape has a frame portion with a width of 0.45 mm to 0.55 mm.

The specific structure of the liquid crystal display apparatus provided by the present invention is the same or similar to the slim bezel backlight module according to the foregoing preferred embodiment, therefore please refer to the above related descriptions of the preferred embodiment of the backlight module.

The slim bezel backlight module and the liquid crystal display apparatus having the same provided by the present invention have the features that the plastic frame assembly is designed to be integrated by iron material and plastic material, and a few plastic portions of the plastic frame assembly protruded from the sides of the plastic frame assembly to form a zigzagged surface for increasing the adhesion area for the square-shaped adhesive tape, thereby solving the problem that the lack of enough border width makes the plastic frame assembly hard to be assembled, and achieving that the liquid crystal display apparatus can have a wider display screen compared with other liquid crystal display apparatuses of the same size.

In conclusion, although the present invention has been described with reference to the preferred embodiment thereof, it is apparent to those skilled in the art that a variety of modifications and changes may be made without departing from the scope of the present invention which is intended to be defined by the appended claims.

What is claimed is:
1. A slim bezel backlight module comprising:
a light source providing backlighting for a liquid crystal panel;
a reflector used to reflect light to a desired surface;
a light guide plate used to convert light emitted from the light source into a directional surface light source;
a plastic frame assembly, including an iron frame disposed on a bottom and a plastic member disposed on the iron frame, and being used to fix the light guide plate; wherein the iron frame has two ends where one end extends to one side close to a light source, and the other end extends to another side opposite to the light source, and the ends of the iron frame are provided with a plurality of bending structures;
a square-shaped adhesive tape being adhered to a surface of the plastic frame assembly; and
a plurality of bumps formed inside the bending structures of the plastic frame assembly by plastic injection; wherein top surfaces of the bumps are co-planar with a top surface of the plastic frame assembly; each of the bumps has a protruding width of 0.1 mm to 0.15 mm; wherein
the bumps are divided into a first bump group and a second bump group; the first bump group and the second bump group are mounted on two sides of the plastic frame assembly, respectively.

2. The slim bezel backlight module as claimed in claim 1, wherein the bumps in the first bump group and the second bump group are disposed at intervals along a transverse direction.

3. The slim bezel backlight module as claimed in claim 1, wherein the bumps in the first bump group and the bumps in the second bump group are symmetrically arranged relative to a center defined by a longitudinal axial line of the plastic frame assembly.

4. The slim bezel backlight module as claimed in claim 1, wherein the bumps in the first bump group and the bumps in the second bump group are symmetrically arranged relative to a center defined by a transverse axial line of the plastic frame assembly.

5. The slim bezel backlight module as claimed in claim 2, wherein the adjacent bumps are distributed at equal intervals.

6. The slim bezel backlight module as claimed in claim 2, wherein the adjacent bumps are distributed at unequal intervals.

7. The slim bezel backlight module as claimed in claim 6, wherein an interval between the adjacent bumps disposed close to the ends of the plastic frame assembly is smaller than the interval between the adjacent bumps disposed close to the middle of the plastic frame assembly.

8. The slim bezel backlight module as claimed in claim 1, wherein the plastic frame assembly has a side portion with a width of 0.2 mm to 0.3 mm.

9. The slim bezel backlight module as claimed in claim 1, wherein a frame portion of the square-shaped adhesive tape is adhered to a top of the plastic frame assembly; and an outer edge of the frame portion of the square-shaped adhesive tape extends to an edge of the bumps, and an inner edge of the frame portion of the square-shaped adhesive tape extends 0.1 mm to 0.2 mm beyond an inner side of the plastic frame assembly.

10. The slim bezel backlight module as claimed in claim 1, wherein the square-shaped adhesive tape has a frame portion with a width of 0.45 mm to 0.55 mm.

11. A slim bezel backlight module comprising:
a light source providing backlighting for a liquid crystal panel;

a reflector used to reflect light to a desired surface;

a light guide plate used to convert light emitted from the light source into a directional surface light source;

a plastic frame assembly, including an iron frame disposed on a bottom and a plastic member disposed on the iron frame, and being used to fix the light guide plate; wherein the iron frame has two ends where one end extends to one side close to a light source, and the other end extends to another side opposite to the light source, and the ends of the iron frame are provided with a plurality of bending structures;

a square-shaped adhesive tape being adhered to a surface of the plastic frame assembly; and a plurality of bumps formed inside the bending structures of the plastic frame assembly by plastic injection; wherein top surfaces of the bumps are co-planar with a top surface of the plastic frame assembly.

12. The slim bezel backlight module as claimed in claim 11, wherein the bumps divided into a first bump group and a second bump group; the first bump group and the second bump group are mounted on two sides of the plastic frame assembly, respectively.

13. The slim bezel backlight module as claimed in claim 12, wherein the bumps in the first bump group and the second bump group are disposed at intervals along a transverse direction.

14. The slim bezel backlight module as claimed in claim 12, wherein the bumps in the first bump group and the bumps in the second bump group are symmetrically arranged relative to a center defined by a longitudinal axial line of the plastic frame assembly.

15. The slim bezel backlight module as claimed in claim 13, wherein the adjacent bumps are distributed at equal intervals.

16. The slim bezel backlight module as claimed in claim 11, wherein the plastic frame assembly has a side portion with a width of 0.2 mm to 0.3 mm.

17. The slim bezel backlight module as claimed in claim 11, wherein a frame portion of the square-shaped adhesive tape is adhered to a top of the plastic frame assembly; and an outer edge of the frame portion of the square-shaped adhesive tape extends to an edge of the bumps, and an inner edge of the frame portion of the square-shaped adhesive tape extends 0.1 mm to 0.2 mm beyond an inner side of the plastic frame assembly.

18. The slim bezel backlight module as claimed in claim 11, wherein the square-shaped adhesive tape has a frame portion with a width of 0.45 mm to 0.55 mm.

19. A liquid crystal display apparatus, comprising a slim bezel backlight module and a liquid crystal panel fixed on the slim bezel backlight module; wherein the slim bezel backlight module includes:

a light source providing backlighting for a liquid crystal panel;

a reflector used to reflect light to a desired surface;

a light guide plate used to convert light emitted from the light source into a directional surface light source;

a plastic frame assembly, including an iron frame disposed on a bottom and a plastic member disposed on the iron frame, and being used to fix the light guide plate; wherein the iron frame has two ends where one end extends to one side close to a light source, and the other end extends to another side opposite to the light source, and the ends of the iron frame are provided with a plurality of bending structures;

a square-shaped adhesive tape being adhered to a surface of the plastic frame assembly; and a plurality of bumps formed inside the bending structures of the plastic frame assembly by plastic injection; wherein top surfaces of the bumps are co-planar with a top surface of the plastic frame assembly.

20. The liquid crystal display apparatus as claimed in claim 19, wherein the bumps are divided into a first bump group and a second bump group; the first bump group and the second bump group are mounted on two sides of the plastic frame assembly, respectively.

\* \* \* \* \*